United States Patent [19]

Humblot

[11] Patent Number: 4,481,401
[45] Date of Patent: Nov. 6, 1984

[54] PROCESS FOR WELDING COATED PLATES

[75] Inventor: Bernard Humblot, Bazemont, France

[73] Assignee: Steelweld France, Chatou, France

[21] Appl. No.: 343,261

[22] Filed: Jan. 27, 1982

[30] Foreign Application Priority Data

Sep. 24, 1981 [FR] France ................................ 81 18007
Oct. 19, 1981 [FR] France ................................ 81 19595

[51] Int. Cl.³ ............................................. B23K 11/10
[52] U.S. Cl. ..................................... 219/91.2; 219/92;
242/57
[58] Field of Search ..................... 219/91.2, 91.21, 92,
219/94; 242/57

[56] References Cited

U.S. PATENT DOCUMENTS 4,204,180  5/1980  Usui et al. .............................. 242/57

FOREIGN PATENT DOCUMENTS 44-24733 10/1969 Japan ................................... 219/91.2
53-72751  6/1978 Japan ................................... 219/91.2

Primary Examiner—Roy N. Envall, Jr.
Assistant Examiner—Alfred S. Keve
Attorney, Agent, or Firm—Sandler & Greenblum

[57] ABSTRACT

Interposing a coating-compatible strip material between a coated plate to be welded and a welding electrode that contacts that plate during the welding operation so that a coating-compatible film is applied to the plate during the welding process to prevent the removal of the protective coating of the plate. A device for performing the process includes support means for supporting a supply of strip material and guides for interposing the strip material between the plate and the welding electrode that contacts that plate during the welding operation. The strip material may be contained in a cassette which is adapted to be attached to the device.

14 Claims, 9 Drawing Figures

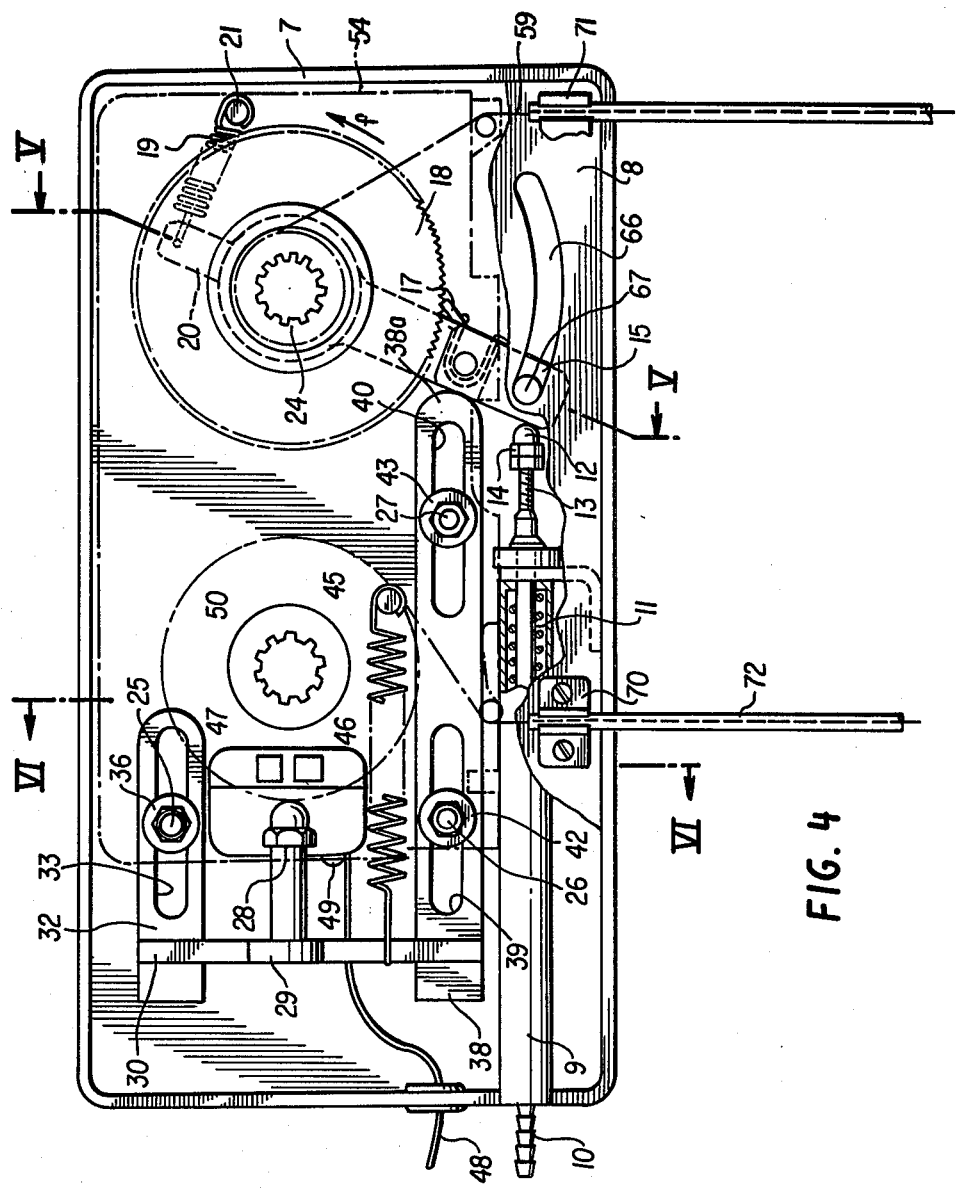
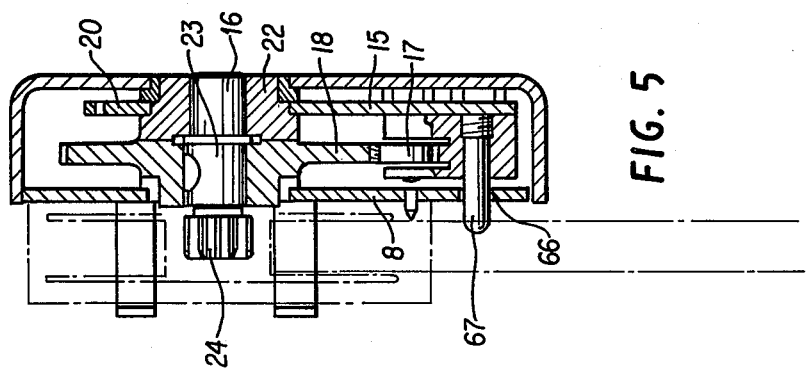
FIG. 4
FIG. 5

PROCESS FOR WELDING COATED PLATES

BACKGROUND OF THE INVENTION

1. Summary of the Invention

The present invention generally relates to a process and apparatus for welding coated plates, for example, electrically zinc-coated or galvanized steel plates, and more particularly to a process and apparatus for inserting a coating-compatible film at the welding point.

2. Description of the Prior Art

In the car industry, particularly in fabricating undercarriages of vehicles, steel plates are used which are coated in order to provide protection against corrosion. The plates are assembled by resistance spot welding which destroys the coating at the welding points. As a result, protection against corrosion normally provided by the coating is comparatively ineffective at the welding points.

Furthermore, resistance spot welding of coated plates of this kind suffers from numerous difficulties. During formation of the weld, a portion of the protective coating tends to stick to the electrodes. As a result, the electrodes become fouled or clogged so that they must be frequently cleaned, necessitating the shutdown of the installation, thus increasing the overall cost of the operation. The fouling of the electrodes increases their resistance, so that the consumption of power is increased.

SUMMARY OF THE INVENTION

One of the aims of the invention is to provide a simple process and apparatus which does not require fundamental modification of the welding apparatus and which will obviate the various drawbacks noted above.

According to one aspect, the invention relates to a process for welding coated steel plates in which at least one welding electrode is applied to the plates. Each electrode is to be connected electrically to a suitable current source such as one or more secondary windings of a transformer having a primary winding designed to be connected to a source of alternating current.

According to the process, a strip of material made of an appropriate material compatible with the coating of the plates to be welded is interposed between each electrode and the corresponding surface of the coated plate to be welded. As a result, the coating of the plate is not removed during welding.

The strip material preferably employed during welding of electrically zinc-coated or galvanized plates will preferably be a copper alloy made of a copper-zinc alloy. Copper forms about 60-65% of the composition of the alloy, the remainder of the composition preferably consisting of zinc. Most preferably the strip materials contain about 63.5-65% copper and about 35-40% zinc.

When the electrode is applied to the strip material a protective film is applied to the welding point which provides satisfactory protection against corrosion at the welding points.

Another advantage provided by the process of the present invention is that the service life of the electrodes is prolonged, since they do not become fouled or clogged, thus the consumption of energy remains essentially constant as the welding operation progresses. Additionally, the welds are regular and can be verified visually.

The present invention also relates to an apparatus or device for the performance of the above-noted process, the device being simple, comparatively inexpensive and easy to mount on different types of welding apparatus.

The device to which the invention relates is adapted to be fitted to welding apparatus and particularly to resistance spot-welding apparatus for welding coated steel plates. These welding machines typically comprise a number of welding electrodes made from copper or an alloy thereof, the electrodes being adapted to be electrically connected to a suitable current source such as one or more secondary windings of a transformer having a primary winding designed to be connected to an alternating current source.

The device of the invention includes means for supporting a supply roll of strip material of an alloy of copper with a material compatible with the coating of the plates to be welded, guiding means for guiding the strip in order to insert it between the plates to be welded and the corresponding electrode, and advancing means for advancing the strip material after each weld has been effected.

This device provides a very simple assembly suitable for application to all types of welding machines and enables a high rate of welding to be achieved.

In order to ensure that no weld can be produced without the strip material interposed between the electrode and the plate, e.g., when the strip material is exhausted, the device may also include sensing means for verifying the size of the roll of strip material in supply, the sensing means being connected to a signalling circuit to prevent operation of the welding machine when the supply has diminished to less than a predetermined quantity.

A further significant feature of the device comprises means for receiving or taking-up the strip material so that the portion of the strip which remains after the spot welding operation can be wound up, as well as means for incrementally winding up that part of the strip remaining after each weld has been produced.

According to one particlar constructional characteristic, the device of the present invention includes a motor shaft for supporting a receiving roller or take-up reel, the motor shaft including a ratchet wheel with which a pawl cooperates. The pawl is borne by a spring biased lever, the lever being independently rotatable about the motor shaft. A single-acting pneumatic jack pushes the lever against the action of the spring bias, thereby driving the motor shaft in a given direction.

Means for modifying the angular displacement of the motor shaft in accordance with the thickness of the strip material remaining wound on the supply roller ensures that a constant length of strip material is moved after each spot welding operation.

According to a further constructional characteristic, the sensing means comprise contacting means borne by an assembly adapted to slide diametrically to the axis of rotation of the supply roll. The assembly applies the contacting means against the supply roll, and a moveable stop on the assembly serves to limit the return travel of the lever in accordance with the amount of strip material in supply.

The supply roll of strip material and the take-up reel may be accommodated in a cassette, the housing of which is secured to the device of the present invention by elastic means.

Preferably manual means are included for rotating the ratchet wheel to properly tension of the strip material during loading.

According to yet another characteristic of the present invention, the guide means are made from an insulating material and comprise substantial C-shaped channel members attachable to the device by elastic clamping means.

BRIEF DESCRIPTION OF THE DRAWINGS

The invention will now be described in greater detail by reference to one particular embodiment discussed merely as an example and illustrated in the accompanying drawings.

FIG. 4 is a front planar view of a device shown in FIG. 2, the cover being removed and the cassette being shown by chain lines;

FIG. 5 is a sectional view taken along line IV—IV of FIG. 4;

DETAILED DESCRIPTION OF THE PREFERRED EMBODIMENTS

Figure 1:
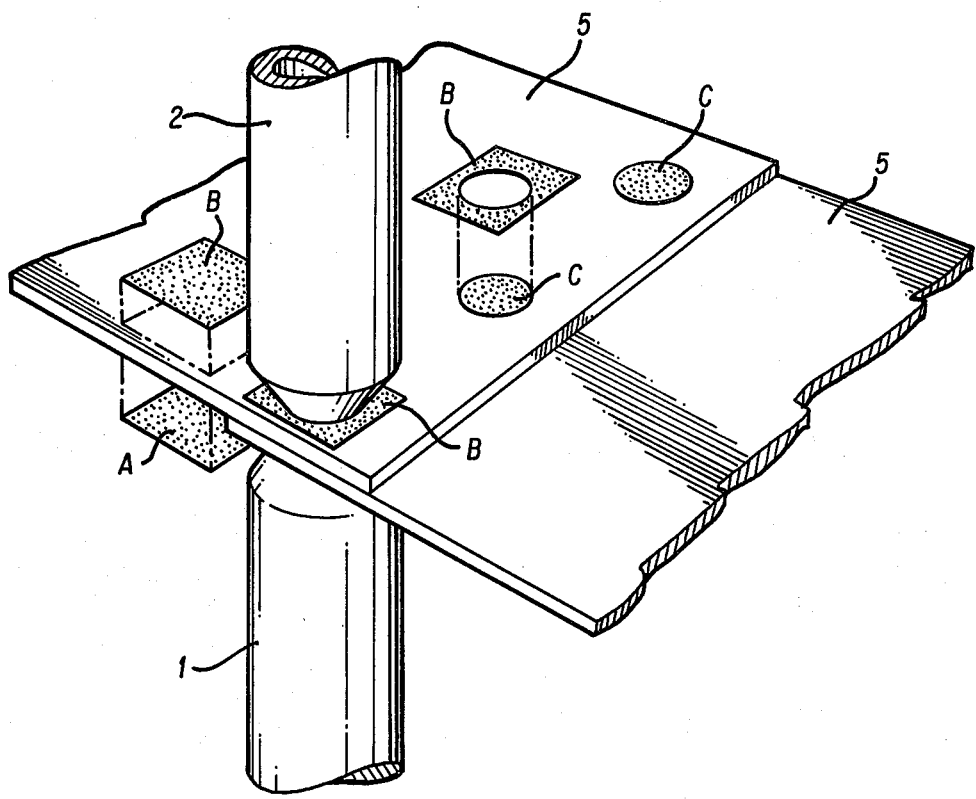
FIG. 1 schematically illustrates the process to which the invention relates.

With reference to FIG. 1, two steel plates 5, with a low carbon content, are shown. The two faces of each plate are coated with a protective film by being passed through a hot galvanization bath.

The thickness of the protective coating may be on the order of, for example, about 20 microns. These plates are secured to one another by means of resistance spot welding, as schematically in the drawing. Typically, plates 5 are correctly oriented with respect to one another and held in place by clamps or the like. Plates 5 are then positioned between electrodes 1 and 2 so that the intended welding site is contacted when the electrodes are brought together. A large current is passed through electrodes 1 and 2 which heats and melts the contacted metal to thereby effect the weld. Electrodes 1 and 2 are then moved apart and the welded plates removed.

The method illustrated is applicable to, for example, a welding unit of the type comprising two copper electrodes 1 and 2, the electrodes facing each other. In the drawing electrode 1 is fixed while electrode 2 is vertically movable, so that plates 5 are pressed against each other during spot welding.

As will be understood by one of ordinary skill in the art, the invention is not limited to the welding unit described above, but can be applied to all types of welding machines and resistance spot welding machines, e.g., those having two movable electrodes as well as those known as the "double spot in series" wherein more than one weld is effected at a time.

Resistance welding machines typically include a transformer with a magnetic circuit, a primary winding connected to a source of alternating current; the secondary winding being connected to the electrodes. Welding machines of this kind are already known per se and, therefore, need not be described here in detail.

According to the process of the invention, strip A is inserted between electrode 1 and plate 5 as electrode 2 is moved away, strip B being likewise inserted between electrode 2 and plate 5.

When electrode 2 has descended and plates 5 are pressed together, spot weld C is produced.

As the spot weld is effected, a small piece of the strip material is cut out of the strip and forms, at the weld, a protective film which provides satisfactory protection against corrosion.

Broadly, copper may account for about 60-65% of the strip material composition.

Strips A and B are preferably made of an alloy of copper and zinc, in which the copper may account for between about 63.5 and 65% of the composition of the alloy with the remainder of the alloy consisting of zinc.

From the above it is clear that the process of the invention offers numerous advantages, including the fact that the spot welding operation, instead of damaging the coating, forms a protective layer by depositing a copper alloy film which itself provides protection.

Furthermore, since the process prevents the protective coating on the plates from adhering to the electrodes, the service life of the latter is lengthened. Finally, the consumption of electrical energy, as compared to known spot welding operations, is reduced, since the electrodes are not fouled or clogged and their electrical resistance does not increase with use.

Figure 2:
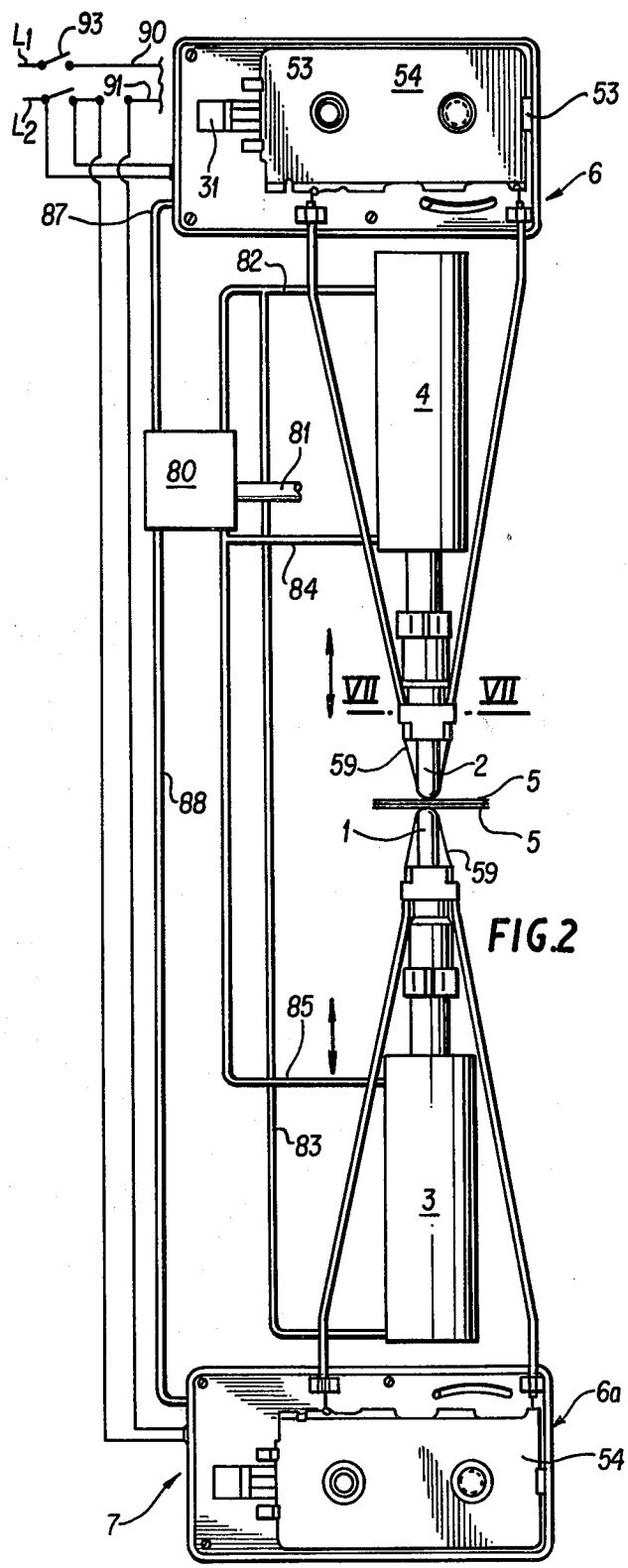
FIG. 2 is a front planar view of a device according to the invention in use in a welding machine.

The device of the invention is adapted to be fitted to any welding machine and particularly to a resistance spot welding machine of the type shown schematically in FIG. 2.

In this embodiment it will be assumed that the two electrodes 1 and 2 are connected to jacks 3 and 4, respectively, in order to cause both of the electrodes to move closer together to grip coated steel plates 5.

The device according to the invention is provided for each of electrodes 1 and 2, the devices being indicated generally by reference numerals 6 and 6a. Devices 6 and 6a are identical, so that only 6 will be described in detail.

Figure 3:
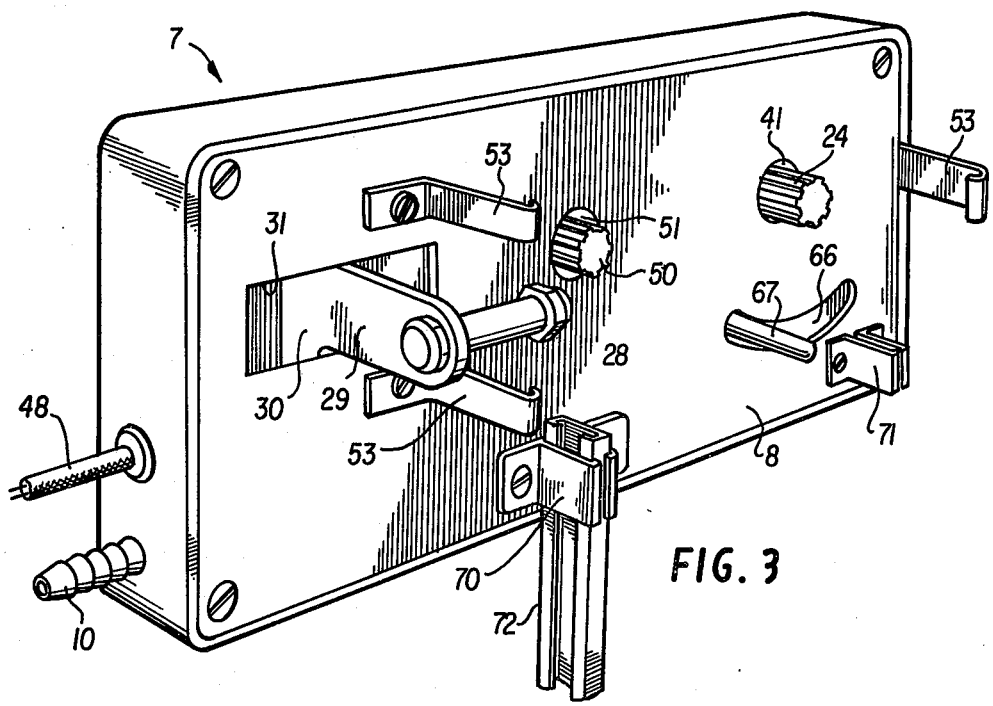
FIG. 3 is a perspective view of the device according to the invention.

As illustrated by FIGS. 3, 4 and 5, device 6 comprises a box or housing, generally indicated at 7, closed by cover 8. Housing 7 contains means for advancing the strip material, the advancing means including drive means in the form of cylinder 9 of a pneumatic jack including end socket 10 for connecting the jack to a source of compressed air or the like. A piston is movable in cylinder 9 opposite to the action of restoring spring 11, the end of the piston rod being provided with screw threading 13 designed to receive blind nut 12 with counter-nut or locking-nut 14; blind nut 12 forming a thrust head for lever 15. Lever 15, also a portion of the drive means, is integral with ring 22 guided in a bearing belonging to the base of housing 7 and traversed by loose shaft 16. Lever 15 includes pawl 17 for engaging the teeth of ratchet wheel 18; lever 15 having short extension 20 engaged by one of the ends of draw spring 19 of which the other end is affixed to stud 21 provided on the base of housing 7. Spring 19 is the biasing means for biasing the lever 15 in opposition to the desired direction of rotation of shaft 16.

Socket 23, keyed to shaft 16, is integral with pinion 24 projecting from the surface of cover 8 via aperture 41 as seen in FIG. 3, the ratchet wheel 18 being keyed onto the socket 23. Shaft 16 is also considered a part of the advancing means for advancing the strip material.

Bar 30 is provided at its central part with boss 29 which passes through aperture 31 in cover 8 and which supports sensing device 28. Sensing device 28 is the sensing means for sensing the amount of strip material in supply and includes the contact means for contacting the outer peripheral surface of the strip material in supply.

Figure 6:
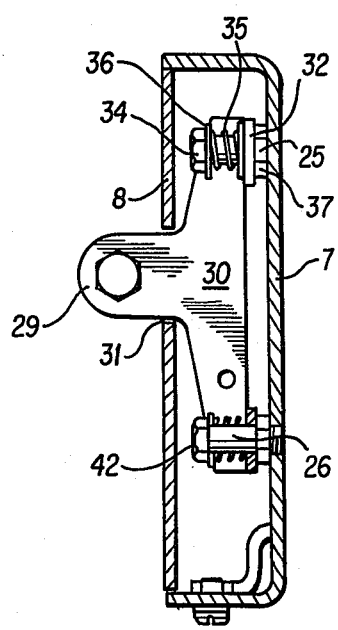
FIG. 6 is a sectional view taken along line V—V of FIG. 4.

Referring to FIGS. 4 and 6, bar 30 is integral with plate 32 having elongated aperture 33 through which extends stud 25 integral with the base of housing 7 and accommodating nut 34 on its screw threaded free end. Spring 35 is interposed between washers 36 in order to keep plate 32 applied against shoulder 37 of the stud.

At the end opposite to that integral with plate 32, bar 30 is integral with second plate 38 having two elongated apertures 39 and 40 guided on studs 26 and 27, respectively. Studs 26 and 27 are screw threaded at their free end in order to receive nuts 42 and 43, respectively. Washers and springs are interposed, so that they will be mounted in exactly the same way as plate 32. Thus, the assembly is adapted to slide freely over a length corresponding to that of apertures 33, 39 and 40.

One of the ends of draw spring 46 is secured to stud 45 mounted on the base of housing 7, the other end of which is affixed to bar 30.

Switch 47 is provided in housing 7 and connected by flexible conductor cable 48 to the electrical control arrangement of the welding machine so as to open the main circuit when contact 49 is actuated by bar 30 (see FIG. 2).

As seen in FIGS. 3 and 4, shaft 50, which is the support means for supporting a supply of strip material, is journalled at the base of housing 7 and extends through aperture 51 in cover 8. Shaft 50 is provided at its free end with a system of teeth identical to the system of teeth 24.

Figure 8:
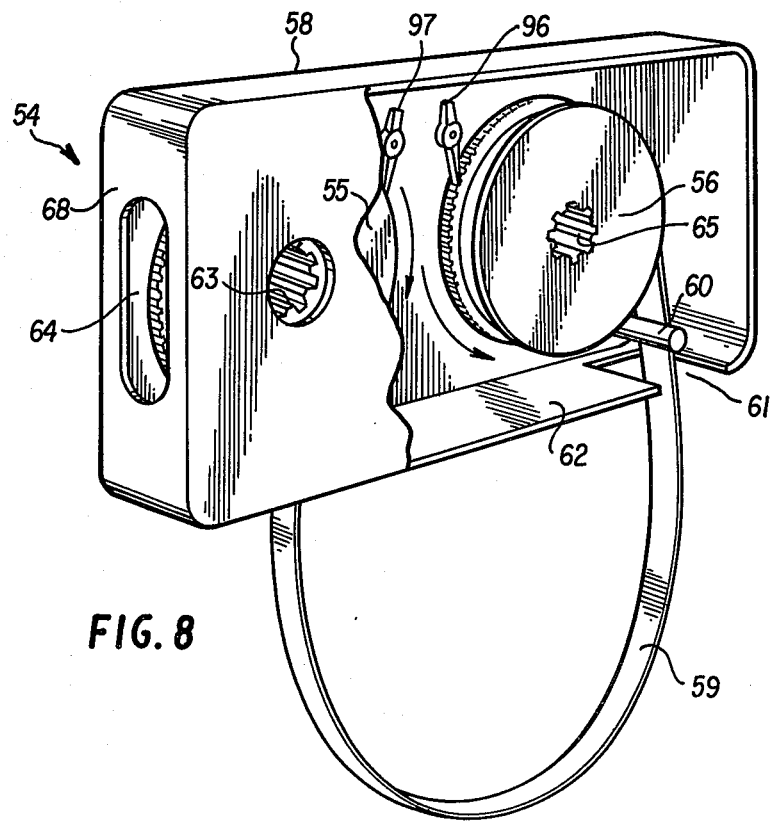
FIG. 8 is a perspective view, partially in section, of a cassette.

Cover 8 bears elastic taps 53 which are attachment means for removably securing a cassette, generally indicated at 54 in FIG. 8. Cassette 54 comprises a box or housing 58, delivery or supply roller 55, and receiving or take-up reel 56 for receiving strip material 59, strip material 59 being adapted to prevent the coating of plates 5 from being removed during a welding operation.

Housing 58 of cassette 54 includes guide studs 60 for strip material 59, which is threaded through apertures 61 in one of side walls 62. Aperture 64 is also provided to permit the passage of the sensing device 28 through wall 68 of housing 58.

Supply roller 55 has grooved central circular hole 63, freely rotatable shaft 50 engaging the grooves in hole 63 when the cassette 54 is in position. Thus, supply roller 55 is freely rotatable on shaft 50.

Receiving or take-up reel 56 is provided with a grooved central hole identically similar to hole 63 and when cassette 54 is in position, pinion 24 is integral with take-up reel 56.

Retaining pawls 96 and 97, mounted on the base of housing 58, interact with a system of teeth on one side of roller 55 and reel 56 in order to permit rotation only in the directions indicated by the arrows shown in FIG. 8.

As illustrated in FIG. 3, cover 8 has curved aperture 66 through which projects stud 67 integral with lever 15 to permit ratchet wheel 18 and, therefore, reel 56 to be rotated manually.

Figure 7:
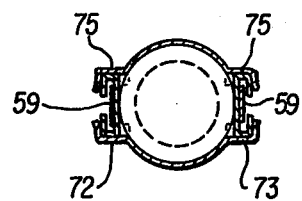
FIG. 7 is a sectional view along line VI—VI of FIG. 2.

Cover 8 is provided with two pairs of elastic taps 70 and 71 designed to detachably hold C-shaped guide members 72 and 73 in position. Members 72 and 73 may, for example, be made of a plastic insulating material and are the guide means for guiding the strip material between one of the metal plates to be welded and the welding electrode that contacts that plate during welding. Guide members 72 and 73 serve to guide strip material 59 and are fixed in the vicinity of electrode 2 by means of elastic clamps 75, as illustrated in FIG. 7. Elastic clamps 75 are the attachment means for attaching each guide member to housing 7.

FIG. 2 includes a schematic diagram of the pneumatic circuit of the welding machine. This circuit includes a distributor 80 connected by pipe 81 to a source of compressed air or the like. Jack 4 is a double-acting jack, and the admission of compressed air on the side of the face of the piston provided with the piston rod is effected by means of pipe 84 interposed between jack 4 and distributor 80. Pipe 84 has a branch connection 85 communicating with jack 3 for admitting compressed air into jack 3 on the side of the piston which is integral with the piston rod.

Pipe 82 connects jack 4 to distributor 80 for admitting compressed air into the cylinder on the side corresponding to the free face of the piston, this pipe having branch connection 83 leading into the cylinder of jack 3. As is usual, when one of the ends of the cylinders of the jacks is functioning as the intake end, the other is functioning as the discharge end.

Distributor 80 bears a slide valve serving to control, via pipes 87 and 88, the admission of compressed air into the cylinders of jacks 9 of each device 6 and 6a so that piston rods 13 can be moved to push the corresponding levers 15 of each device 6 and 6a. When the pistons reach the end of their travel, the slide rod is moved, which subjects jacks 9 to free air and the piston rods return to their initial position under the action of springs 11.

FIG. 2 also provides a schematic diagram of the electrical control circuit of the welding machine, the control circuit including two conductors 90 and 91 connected to lines L1 and L2, respectively, main switch 93 being interposed. Switches 47 of devices 6 and 6a are connected to conductor 91.

The operation of the system is best understood from the description that follows.

On each housing 7 of devices 6 and 6a, a cassette 54 is placed in position, the cassettes being secured by elastic taps 53. Once the cassettes are in position, shaft 50 and pinion 24 engage holes 63 and 65, respectively.

Strip material 59 is affixed at the appropriate end to take-up reel 56 and then unrolled in order to engage guides 72 and 73. Strip 59 is then positioned in front of the appropriate electrode.

By acting on stud 67, wheel 18 can be moved in such a way as to starch or tension strip material 59.

It will be noted that in order to place cassette 54 in position, bar 30 has to be moved in opposition to the action of spring 46 by acting on boss 29 and thus moving bar 30 away from contact 49 of switch 47 so that the main electrical circuit of the welding machine is closed. Spring 46 is the biasing means which tends to apply sensing device 28 against the strip material in supply.

Sensing device 28 passes through aperture 64 in cassette 54 and abuts against strip material 59 on the supply roll.

When the welding operation is carried out, pipes 82 and 83 function as admission pipes while pipes 84 and 85 are in contact with the open air. Electrodes 1 and 2 are moved together in order to grip plates 5 and that part of strip material 59 which is positioned between the electrodes and the plates.

After the individual weld has been produced, electrodes 1 and 2 are caused to move apart, pipes 84 and 85 then operating as admission pipes while pipes 82 and 83 operate as discharge pipes.

When electrodes 1 and 2 have been moved apart by the admission of compressed air via pipes 84 and 88, compressed air is conveyed into jacks 9 of devices 6 and 6a. The piston of jack 9 moves in opposition to the action of spring 11 while thrust head 12, bearing against level 15, causes the latter to pivot in the direction shown by arrow "f" in FIG. 4, in opposition to the action of spring 19.

Pawl 17, interacting with the system of teeth of ratchet wheel 18, drives ratchet wheel 18 in such a way that a certain length of strip material 59 is wound onto take-up reel 56.

Pipes 87 and 88 are then put in communication with the open air by distributor 80, and jacks 9 resume their initial position under the action of springs 11.

The same process is repeated during each welding operation so that a copper alloy film, constituting a protection layer in itself, is deposited at the point where the weld is made. Additionally, it will no longer be possible for part of the coating of the plates to stick to the electrodes since strip material 59 is interposed between the electrodes and the plates to be welded.

It will be noted that rod 13 of the piston of jack 9 moves over the same length on each cycle of the welding operation and that the thickness of the supply roll of strip material 59 decreases, while that of take-up reel 56 increases. Thus, with a constant angular displacement of lever 15, the length of strip material 59 wound onto take-up reel 56 will be very limited in the event of a considerable thickness in the delivery or supply roll, while on the other hand, when the diameter of strip material 59 on take-up reel 56 is considerable, the length of strip material 59 wound onto reel 56 will be far greater.

In order to eliminate this drawback and ensure that after each individual spot welding operation strip 59 will have moved over a constant length, regardless of the respective diameters of the delivery and receiving reels, the device causes the angular displacement of lever 15 to be reduced as and when the diameter of strip material 59 on take-up reel 56 increases.

In order to achieve this, the free end of plate 38 is arranged in such a way as to form stop or limiting means 38a against which lever 15 can come to rest.

In FIG. 4 it has been assumed that delivery or supply roll 55 is full, while take-up reel 56 is practically empty. On each displacement of rod 13 of the piston of jack 9, lever 15 will pivot in the active direction (direction shown by the arrow "f") through an angle corresponding to the travel of the piston.

As the diameter of strip material 59 being wound onto reel 56 increases, the diameter of the material in supply on roller 55 decreases and sensing device 28 thus moves under the action of spring 46 while plates 32 and 38, due to their elongated apertures 33, 39 and 40, move toward that side of housing 7 which is adjacent to shaft 16. Stop 38a thus moves into position on the return path of lever 15.

Figure 9:
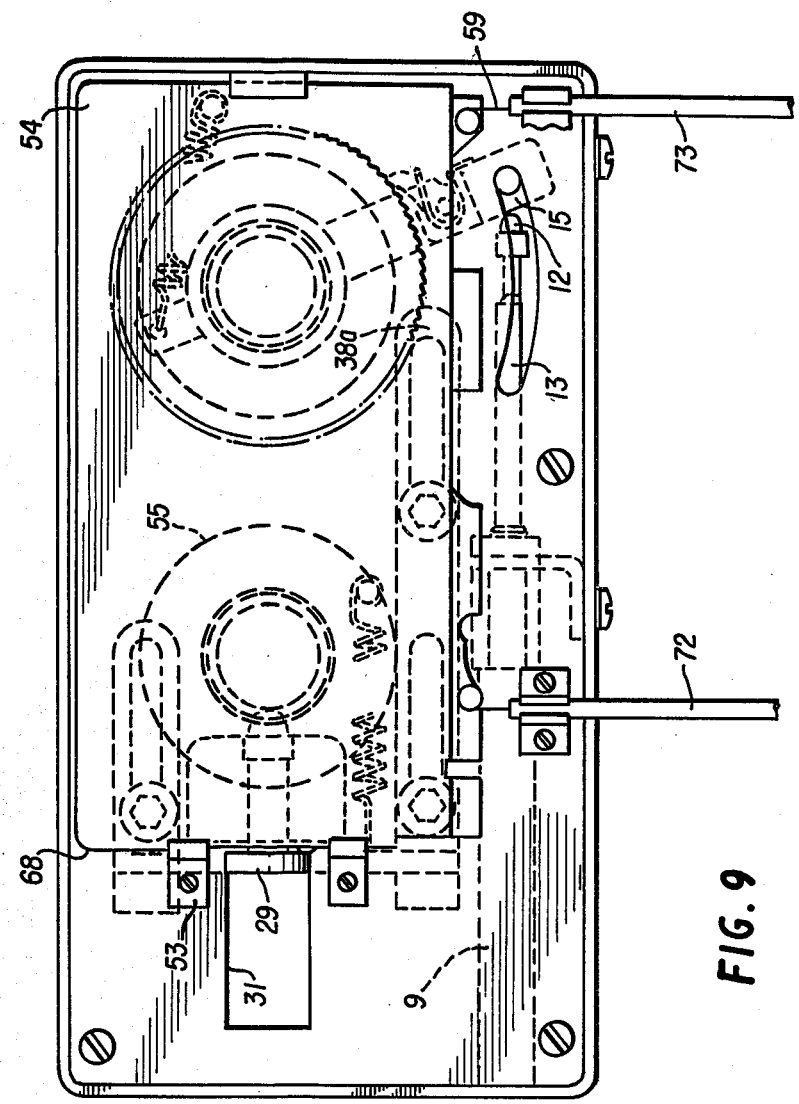
FIG. 9 is a front planar view similar to FIG. 4, the supply spool being assumed to be empty.

As the diameter of strip material 59 on take-up reel 56 increases, with stop 38a advancing, the active distance or rotation of lever 15 decreases. As may be seen from FIG. 9, since stop 38a opposes a return of lever 15 to its initial position under the action of spring 19 when jack 9 is subjected to pressure, part of the travel of thrust head 12 is effected without lever 15 being touched.

A system of this kind is simple, reliable and free of complications, ensuring that the strip material 59 is incrementally advanced a constant length during each welding operation.

When strip material 59 has been completely unwound, roller 55 thus being empty, bar 30 touches contact 49, which opens the control circuit of the assembly, so that the machine comes to a stop.

It is also possible to provide a circuit for indicating that the delivery spool is empty or almost empty, this circuit being controlled by switch 49 and operating an audible or visual signal.

In the embodiment illustrated it has been assumed that electrodes 1 and 2 are both vertically mobile. The device to which the invention relates could equally well be fitted to welding machines with only one movable electrode. In this case the movement of strip material 59 would be effected after removal of the plates 5, the spot welding operation having been performed.

The invention is not confined to the embodiment described and illustrated, and numerous modifications in matters of details could be introduced without thereby departing from the scope of the invention.

What is claimed is:

1. A process for welding coated plates wherein at least one welding electrode is applied on a said plate to be welded, comprising:
    (a) interposing a strip material between said electrodes and a coated surface of said plate to be welded, said strip material comprising an alloy of copper and a metal capable of being alloyed with said coating of said plate to be welded; and
    (b) welding said plate such that during welding, a portion of said strip material which is in contact with said electrode and said plate to be welded is alloyed with said coating, so that a part of said strip material is detached to form a coating to replace a part of said coating removed by said welding of said plate.

2. The process as recited in claim 1, wherein said coating is selected from the group consisting of galvanized coatings and zinc.

3. The process as recited in claim 1, wherein said strip material comprises an alloy containing copper and zinc.

4. The process as recited in claim 1, wherein said strip material comprises an alloy containing between about 60% to 65% copper.

5. The process as recited in claim 1, further comprising repeating said welding and interposing fresh strip material immediately after each weld.

6. The process as recited in claim 1, further comprising the steps of:
    (a) supporting a supply of said strip material prior to said step of interposing said strip material;
    (b) guiding said strip material between said at least one welding electrode and the corresponding surface of the plate contacted thereby;
    (c) effecting the weld; and
    (d) incrementally advancing said strip material after said welding.

7. The process as recited in claim 6, further comprising the steps of:
   (a) sensing the amount of said strip material in supply; and
   (b) signalling when the supply of said strip material reaches a predetermined quantity.

8. The process as recited in claim 7, and wherein said strip material is incrementally advanced by a constant length after each weld is effected.

9. The process as recited in claim 1 wherein said plates are made of steel.

10. The process as recited in claim 6 wherein said strip material is incrementally advanced by incrementally driving a driveshaft or supporting a take-up reel for receiving a portion of said strip material that remains after each weld is effected.

11. The process as recited in claim 7 wherein the amount of said strip material in supply is sensed by sensing the position of a sliding assembly carrying a contacting member for contacting the outer peripheral surface of said strip material on a supply roll, said sliding assembly being slidable diametrically with respect to the axis of rotation of said supply roll, and wherein said sliding assembly is biased toward said supply roll such that said contacting member is biased against said strip material on said supply roll.

12. The process as recited in claim 11 further comprising decreasing the angular displacement of said driveshaft in proportion to the amount of said strip material in supply.

13. The process as recited in claim 12 wherein the angular displacement of said driveshaft is decreased by limiting its displacement with a movable stop associated with said sliding assembly, said stop limiting the return of a lever independently rotatable about said driveshaft in proportion to the thickness of said strip material on said supply roll so that said strip material is incrementally advanced a constant length after each weld is effected.

14. The process as recited in claim 13 further comprising preventing welding when the supply of said strip material reaches a predetermined quantity.

* * * * *